United States Patent
Mimeault et al.

(10) Patent No.: US 12,298,169 B2
(45) Date of Patent: May 13, 2025

(54) SYSTEMS AND METHODS FOR DETERMINING A FILL LEVEL

(71) Applicant: ABB Schweiz AG, Baden (CH)

(72) Inventors: Yvan Mimeault, Quebec (CA); Raphael Desbiens, Quebec (CA); Simon Labrecque, Saint-Augustin de Desmaures (CA)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/589,252

(22) Filed: Jan. 31, 2022

(65) Prior Publication Data

US 2023/0243688 A1    Aug. 3, 2023

(51) Int. Cl.
*G01F 23/296*    (2022.01)
*G01F 23/80*    (2022.01)

(52) U.S. Cl.
CPC ............ *G01F 23/296* (2013.01); *G01F 23/80* (2022.01)

(58) Field of Classification Search
CPC .............................. G01F 23/296; G01F 23/80
See application file for complete search history.

(56) References Cited

U.S. PATENT DOCUMENTS

| | | | |
|---|---|---|---|
| 8,022,862 B2 | 9/2011 | Larocque et al. | |
| 8,655,605 B2 | 2/2014 | Welle et al. | |
| 2005/0052314 A1* | 3/2005 | Spanke | G01F 25/20 |
| | | | 342/124 |
| 2010/0307251 A1* | 12/2010 | Welle | G01S 7/4866 |
| | | | 367/87 |
| 2012/0035867 A1* | 2/2012 | Welle | G01F 23/284 |
| | | | 702/55 |
| 2012/0174664 A1* | 7/2012 | Welle | G01F 23/284 |
| | | | 73/290 V |
| 2012/0299768 A1* | 11/2012 | Griessbaum | G01F 23/296 |
| | | | 367/128 |
| 2013/0063298 A1* | 3/2013 | Gorenflo | G01F 23/284 |
| | | | 342/124 |

FOREIGN PATENT DOCUMENTS

EP    3688420 B1 *    7/2023    ........... G01F 23/284

* cited by examiner

*Primary Examiner* — Jennifer Bahls
*Assistant Examiner* — Quang X Nguyen
(74) *Attorney, Agent, or Firm* — McCarter & English, LLP; Michael M. Gnibus

(57) ABSTRACT

A system for measuring a fill level of a tank is provided. The system includes a sensor disposed in the tank and configured to generate echo data. The system further includes a computing device including a memory configured to store a plurality of historical echo lists and a processor coupled in communication with the sensor. The processor is configured to generate an echo curve based on echo data received from the sensor, generate an echo list by identifying, from the generated echo curve, a plurality of echoes, generate a plurality of echo tracks by comparing the generated echo list to the plurality of historical echo lists, identify a top level echo track from the plurality of echo tracks, the top level echo track having shifted by a threshold distance, and record a current fill level based on the identified top level echo track.

20 Claims, 5 Drawing Sheets

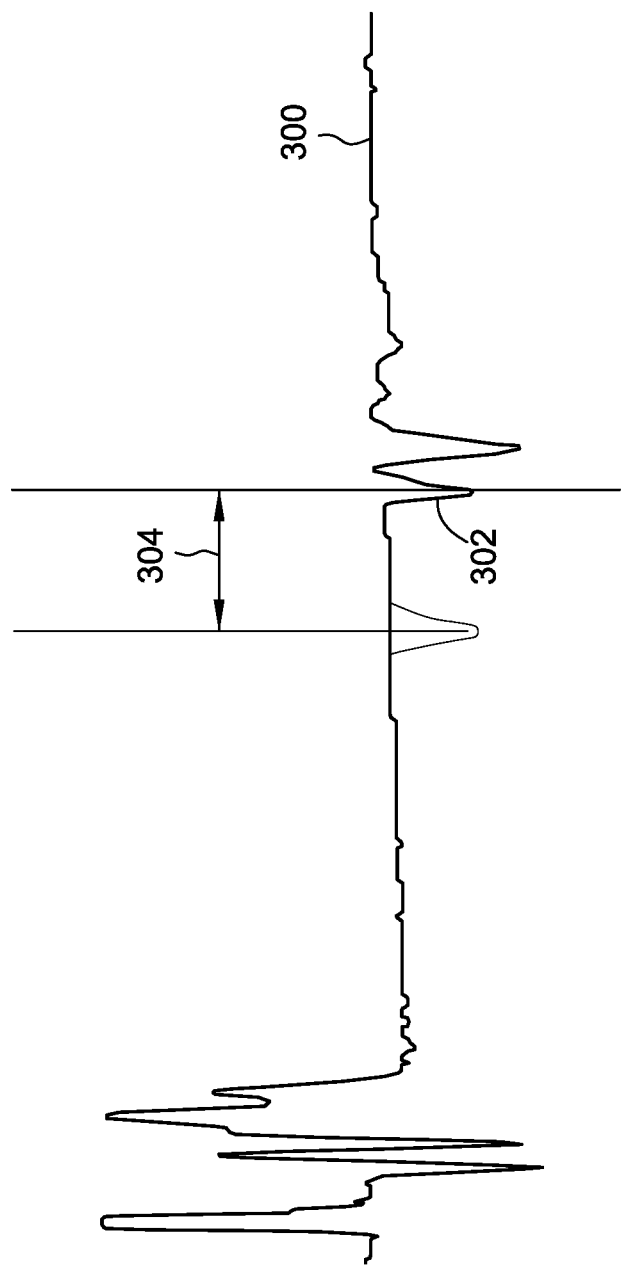

SYSTEMS AND METHODS FOR DETERMINING A FILL LEVEL

FIELD OF THE DISCLOSURE

The present disclosure relates generally to systems and methods for determining a fill level of a vessel such as a tank. In particular, the present disclosure relates to measuring echo characteristics within a tank to determine a fill level.

BACKGROUND

In industrial or other settings, it is advantageous to be able to accurately measure a fill level of vessels such as tanks. Level measurement techniques such as guided wave radar rely on timing of electromagnetic pulses reflected by material in order to identify the position (i.e., level) of a surface of a liquid or other material in the tank. The amplitude of these reflected echoes varies according to changes in surrounding, material properties such as their dielectric constant. Materials with low dielectric constants such as oil will generate echoes of small amplitude, while materials such as water with high dielectric constants will generate echoes with large amplitude. Components located around the level sensors, such as tank walls, piping, and ladders, can result in undesired reflections that may be mistakenly identified as the target material level.

One approach for differentiating between echoes corresponding to the liquid surface and echoes corresponding to other objects is to utilize a minimum amplitude threshold to distinguish the material reflections from other echoes caused by fixed components in the vicinity of the sensor (e.g., a nozzle, a probe, and/or surfaces in the tank). This approach requires that the amplitude of material reflections is larger than the amplitude of false echoes. However, these strategies to discriminate the material level from false echoes will fail in installations where the false echoes have a higher amplitude than top level echoes and are located at positions where the material level can reach in normal operation of the vessel, for example, in applications with materials of low dielectric constant such as oil.

Another approach uses a velocity of the liquid surface to determine which echo corresponds to the surface and measure the surface level accordingly. However, in some circumstances, a velocity of the liquid surface may not be readily measured. An improved system for determining a fill level is therefore desirable.

BRIEF DESCRIPTION

In one aspect a system for measuring a fill level of a tank is provided. The system includes a sensor at least partially disposed in the tank and configured to generate echo data. The system further includes a computing device including a memory configured to store a plurality of historical echo lists and a processor coupled in communication with the sensor. The processor is configured to generate an echo curve based on echo data received from the sensor. The processor is further configured to generate an echo list by identifying, from the generated echo curve, a plurality of echoes. The processor is further configured to generate a plurality of echo tracks by comparing the generated echo list to the plurality of historical echo lists. The processor is further configured to identify a top level echo track from the plurality of echo tracks, the top level echo track having shifted by a threshold distance. The processor is further configured to record a current fill level based on the identified top level echo track.

In another aspect, a method for measuring a fill level of a tank is provided. The method is performed by a system including a sensor at least partially disposed in the tank and configured to generate echo data and a computing device including a memory configured to store a plurality of historical echo lists and a processor coupled in communication with the sensor. The method includes generating, by the processor, an echo curve based on echo data received from the sensor. The method further includes generating, by the processor, an echo list by identifying, from the generated echo curve, a plurality of echoes. The method further includes generating, by the processor, a plurality of echo tracks by comparing the generated echo list to the plurality of historical echo lists. The method further includes identifying, by the processor, a top level echo track from the plurality of echo tracks, the top level echo track having shifted by a threshold distance. The method further includes recording, by the processor, a current fill level based on the identified top level echo track.

In another aspect, a computing device for measuring a fill level of a tank is provided. The computing device includes a memory configured to store a plurality of historical echo lists and a processor coupled in communication with a sensor at least partially disposed in the tank. The sensor is configured to generate echo data. The processor is configured to generate an echo curve based on echo data received from the sensor. The processor is further configured to generate an echo list by identifying, from the generated echo curve, a plurality of echoes. The processor is further configured to generate a plurality of echo tracks by comparing the generated echo list to the plurality of historical echo lists. The processor is further configured to identify a top level echo track from the plurality of echo tracks, the top level echo track having shifted by a threshold distance. The processor is further configured to record a current fill level based on the identified top level echo track.

The foregoing and other aspects, features, details, utilities, and advantages of the present disclosure will be apparent from reading the following description and claims, and from reviewing the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 is a plot of another example echo curve that may be produced by the system shown in FIG. 1.

Figure 1:
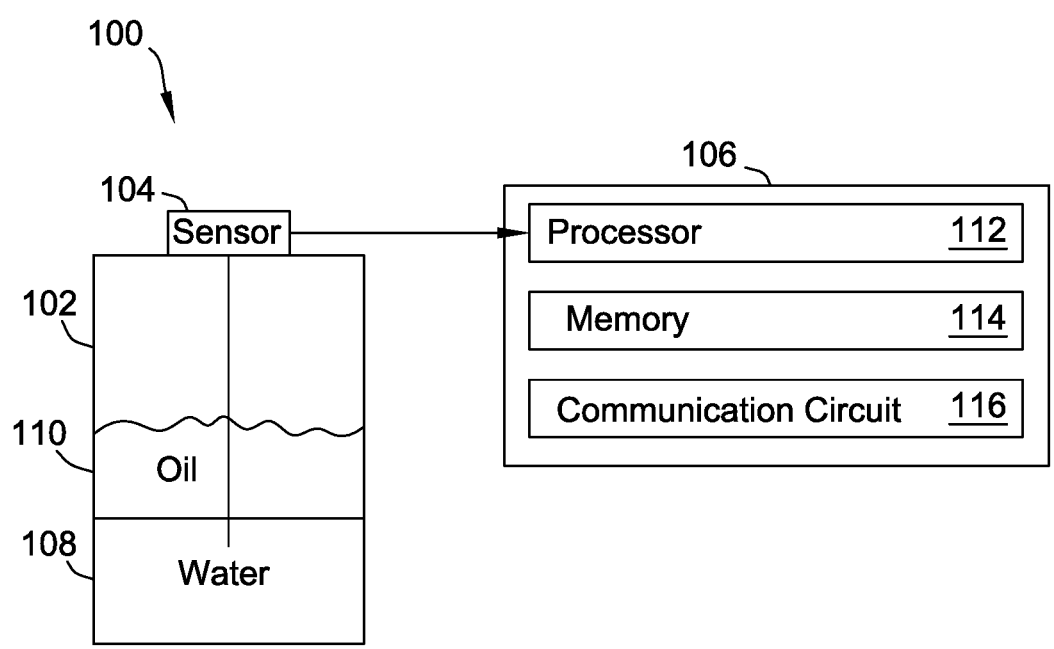
FIG. 1 is a schematic diagram of an example system for determining a fill level of a tank.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION OF THE DISCLOSURE

The present disclosure is directed to a system for measuring a fill level of a liquid in a tank. The system includes a sensor disposed in the tank and configured to generate echo data by emitting signals (e.g., electromagnetic and/or acoustic pulses) and detecting reflected signals (i.e., echoes). The system further includes a computing device including a memory configured to store historical data obtained from the sensor (e.g., historical echo lists, as described in further detail below with respect to FIG. 1). The computing device further includes a processor coupled in communication with the sensor and the memory.

The processor is configured to generate an echo curve (or other type of plot) relating distance within the tank to echo amplitude, based on echo data received from the sensor. The processor is further configured to generate an echo list (e.g., a list identifying echoes detected by the sensor), by identifying echoes from the generated echo curve (e.g., by detecting amplitude peaks). The processor is further configured to identify one of the echoes as a top level echo (e.g., an echo that is determined to correspond to a top surface level of liquid within the tank). The processor is further configured to determine that the top level echo has shifted, over time, by a threshold distance by comparing the generated echo list to at least one of the plurality of historical echo lists. The processor is further configured to record a current fill level based on the identified top level echo and in response to the determination that the top level echo has shifted by a threshold distance.

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

FIG. 1 illustrates an example system 100 for determining a fill level of a tank 102. System 100 includes tank 102, a sensor 104, and a computing device 106. Tank 102 is configured to contain one or more liquids such as, for example water 108 and/or oil 110. While FIG. 1 illustrates tank 102 as containing water 108 and oil 110, tank 102 may include any type of liquids that may be analyzed using the embodiments described herein. The space within tank 102 not occupied by water 108 and/or oil 110 may contain a gas, such as air and/or vapors. In some embodiments, tank 102 may form part of a refinery, chemical production facility, or other facility utilizing water and/or chemical storage, and may serve as a separator, saltwater tank, oil tank, or other type of liquid vessel.

Sensor 104 is at least partially disposed in tank 102 and is configured to generate data (sometimes referred to herein as "echo data") by emitting signals, such as acoustic and/or electromagnetic signals, within tank 102 and detecting reflections of the emitted signals (sometimes referred to herein as "echoes"). Such echoes may result from the emitted signal reflecting off of and interface between fluids within tank 102 (e.g., the surface of oil 110 and the interface between water 108 and oil 110) or other objects (e.g., the bottom surface of tank 102). As described in further detail below, analyzing these echoes based on a time difference between the emitting of the signal and detection of the one or more echoes may be used to determine a fill level of tank 102. Sensor 104 may obtain echo curves at a sampling rate (e.g., five hertz) that is selected based on certain requirements, such as memory space and performance.

Computing device 106 includes a processor 112 and a memory 114, and a communication circuit 116. Processor 112 is coupled in communication with sensor 104 and memory 114 and communication circuit 116. Communication circuit 116 may be embodied as any communication circuit, device, or collection thereof. The communication circuit 116 may be configured to use any one or more communication technology and associated protocols (e.g., Highway Addressable Remote Transducer (HART), Foundation Fieldbus, PROFIBUS, Modbus, Ethernet, Bluetooth®, Wi-Fi®, WiMAX, etc.) to perform such communication.

Processor 112 is configured to receive echo data from sensor 104 and generate one or more data curves (referred to herein as "echo curves") based on the echo data. Each echo curve corresponds to one signal emission event of sensor 104, and relates detected signal magnitude to time elapsed from the emission of the initial signal. Accordingly, peaks of the echo curve represent echoes. As described in further detail below, processor 112 may analyze these echoes to determine which echo corresponds to the surface of the liquid, and based on this, determine the fill level of tank 102. Processor 112 is further configured to store the generated echo curves in memory 114.

Processor 112 is further configured to identify, for each echo curve, a plurality of echoes. Processor 112 identifies the echoes by identifying amplitude peaks in the echo curve, and generates a list (sometimes referred to herein as an "echo list"). When storing the generated echo curves, processor 112 is configured to also store the echo lists in association with the respective echo curves. In some embodiments, processor 112 detects echoes based on a Savitzky-Golay filter and an amplitude threshold. In such embodiments, processor 112 identifies positions of local maxima and minima, and filters the identified local minima and maxima using an amplitude threshold.

When processor 112 generates a new echo curve and echo list based on current sensor data, processor 112 compares the echo curve and echo list to previously generated echo lists (sometimes referred to herein as "historical" echo lists). As described in further detail below, processor 112 is configured to match each echo on the current echo list to echoes on one or more historical echo lists. A set of matched echoes may be referred to herein as an "echo track." Processor 112 is configured to compute a displacement of each echo track over time to categorize the echo track as moving or stationary. Moving echo tracks displace over time as the fill level and composition of tank 102 changes over time. For example, the surface of oil 110 and the interface between water 108 and oil 110 are likely to move over time as tank 102 is filled and/or emptied, and may result in moving echo tracks. Secondary echoes (sometimes referred to herein as "double echoes") resulting from moving surfaces also result in moving echo tracks, which move at twice the rate of the corresponding echoes that initially cause the double echoes.

In some embodiments, processor 112 generates echo tracks may based on recursive filters such as a Kalman Filter and an association algorithm such as Munkres algorithm and/or Hungarian algorithm. In such embodiments, the recursive filter is applies to all echo tracks. Then, all echoes inside a predefined valid echo range are associated to respective tracks using the association algorithm. The association between detected echoes and existing echo tracks may be identified using, for example, the Munkres algorithm, which finds an optimal matrix solution based on the current echo list and historical echo lists. Each echo is assigned a cost value based on a potential association with an existing echo track. This cost may be defined by the sum of a Mahaladonis distance, the amplitude, and the pulse width of the echo. The selected echoes are then associated with a respective echo tracks to minimize a total cost value associated with the echoes, and the echo track corresponding to the surface (sometimes referred to herein as a "top level echo track") is identified. In some such embodiments, a further recursive filter may then be applied to the identified top level echo track. In certain embodiments, new tracks are identified if echoes corresponding to the new track exist for a certain minimum number of consecutive echo curves (e.g., five cycles). Similarly, echo tracks that exceed a maximum number of consecutive echo curves without further association (e.g., 200 cycles) may be deleted.

Processor 112 is further configured to identify one of the echo tracks as a top level echo track corresponding to the top liquid surface. Based on the location of the top liquid surface, processor 112 may compute the fill level of the tank. For example, in some embodiments, an echo track that (i) shows a total displacement exceeding a displacement threshold (e.g., 25 centimeters), and (ii) is located closest to sensor 104, is identified as the top level echo track. In certain embodiments, once the top level echo track is identified, all other echo tracks, for example, those with negligible total displacement and those located between sensor 104 and the top level echo track, are identified as echoes other than top level echo (e.g., false echo, reference echo, nozzle echo, double bounce echo, etc.). Processor 112 is further configured to record a current fill level based on the identified top level echo.

In some embodiments, to identify the top level echo track, processor 112 uses a movement algorithm to identify the first track that reaches a minimum displacement threshold as the top level echo track. If no movement is detected (e.g., no track meets the minimum displacement threshold), and no top level echo track has previously been identified, a top level echo track may be identified using an amplitude threshold until a moving track is detected. If no moving track detected, but a top level echo track was previously identified, the previously identified track remains identified as the top level echo track.

In certain embodiments, if a moving echo track is detected below the top level echo track, the displacement threshold may be increased to avoid false identification. For example, the displacement threshold may be defined as the twice the maximum value between a user-defined minimum displacement threshold and a length between the top level echo track and the detected moving echo track multiplied by a user-defined drift factor. The minimum displacement threshold and drift factor may be selected based on a specific application of tank 102.

Stationary echo tracks do not displace over time. For example, the inner surfaces of tank 102, other solid objects disposed in tank 102 (e.g., nozzles, probes, partitions, and/or other objects), and their corresponding double echoes may result in stationary echo tracks. In some cases, different echo tracks, such as those corresponding to the surface and different interfaces, may merge, as certain liquids are removed from the tank. In certain embodiments, processor 112 may track only a certain number of echo tracks (e.g., 25 echo tracks) at a given time, in order to decrease memory usage.

In some embodiments, over time and usage, processor 112 determines a position of all false echoes (i.e., echoes not corresponding to liquid surfaces or interfaces) as the material surface gets lower or the vessel is emptied. In certain embodiments, only echo tracks having a distance from sensor 104 falling within a predefined range may be identified as the top level echo track. For example, in some such embodiments, only a valid range for the top level echo may be defined as between sensor reference position (sometimes referred to herein as a "blocking distance") and an end of probe (EoP) position. In some embodiments, only echo tracks having at least a threshold amplitude may be identified as a top level echo track. In certain embodiments, only echo tracks having a certain polarity (e.g., opposite sign of the emitted signal) may be identified as a top level echo track. In such embodiments, additional echoes, such as those having a same sign as the emitted signal, may be determined by processor 112 to be double echoes, which may be excluded from consideration.

In some embodiments, if processor 112 is unable to identify a top level echo (i.e., an echo corresponding to the liquid surface that generates the top level echo track over time), or is unable to identify a top level echo that corresponds to a current top level echo track, processor 112 is configured to undergo a hold time period before attempting again to identify the top level echo and/or top level echo track. In some such embodiments, following the hold time period, processor 112 may identify an echo that is within a certain threshold distance of the last known top level echo as the current top level echo.

In some embodiments, processor 112 is further configured to, in applications involving two or more materials (e.g., water 108 and oil 110), measure a location of the interface between two of the materials. Once the top level surface has been identified, it is possible to identify an echo track generated by the interface below the top level. The interface location may be shifted, for example, by draining the high-density material with a valve at the bottom of tank 102, while filling the tank 102 from another valve located at a top of tank 102 with a mixture of both water 108 and oil 110. Once identified, processor 112 may track the interface in a similar manner as tracking the top level of the liquid. In certain embodiments, processor 112 is further configured to determine that two of such interfaces, or one of such interfaces and a top surface, have merged, if the corresponding recorded echo tracks are within a threshold merge distance of each other.

In certain embodiments, processor 112 is further configured to identify recorded echo tracks corresponding to stationary objects. Processor 112 may exclude echo tracks having a fixed location from consideration when determining the top level echo or echoes corresponding to interfaces between different liquids. In some embodiments, processor 112 determines that the fill level has fallen below a certain level (e.g., below an end of probe level of sensor 104) that allows for a detection of all false echoes. In other words, because no surface or interface should be detected below this level, any echoes that are detected below this level may be identified as false echoes.

Figure 2A:
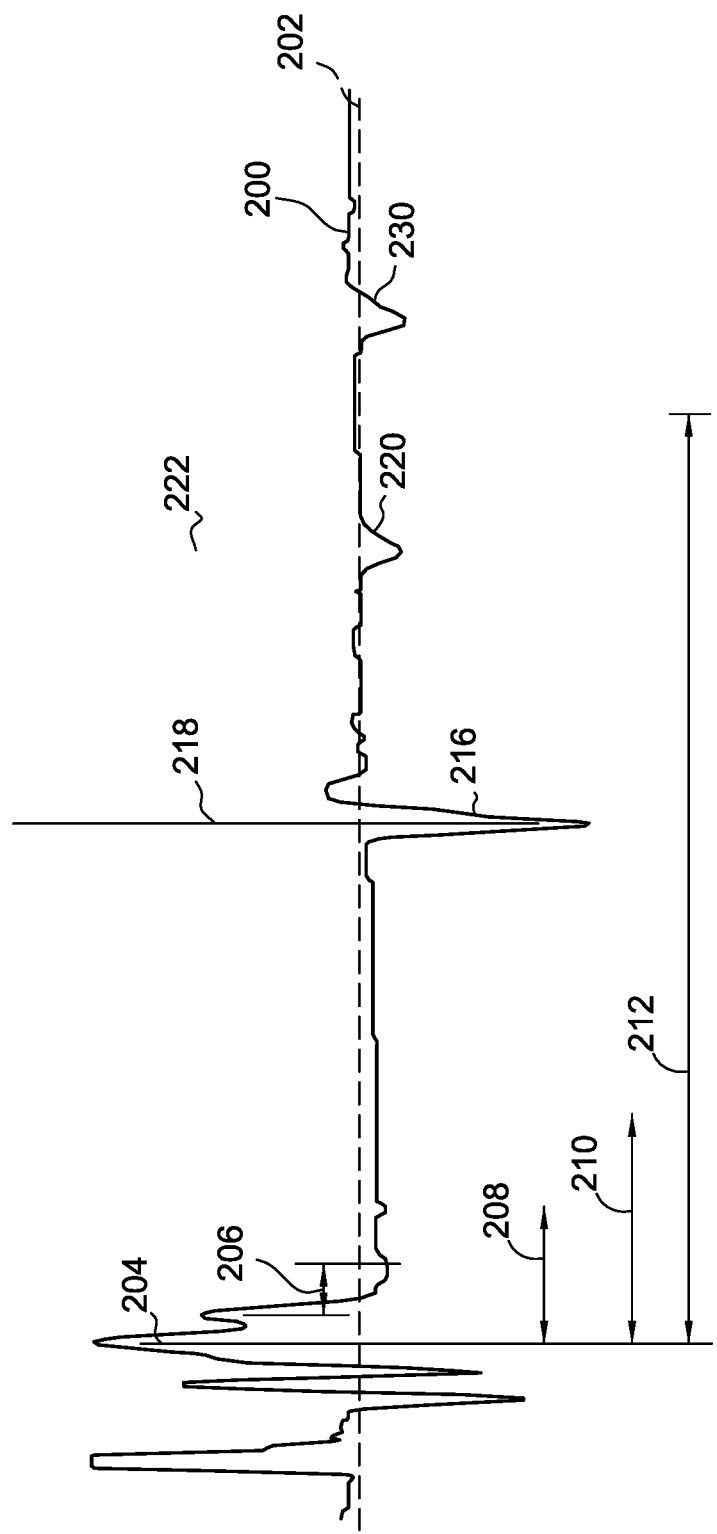
FIG. 2A is a plot of an example echo curve that may be produced by the system shown in FIG. 1.
Figure 2B:
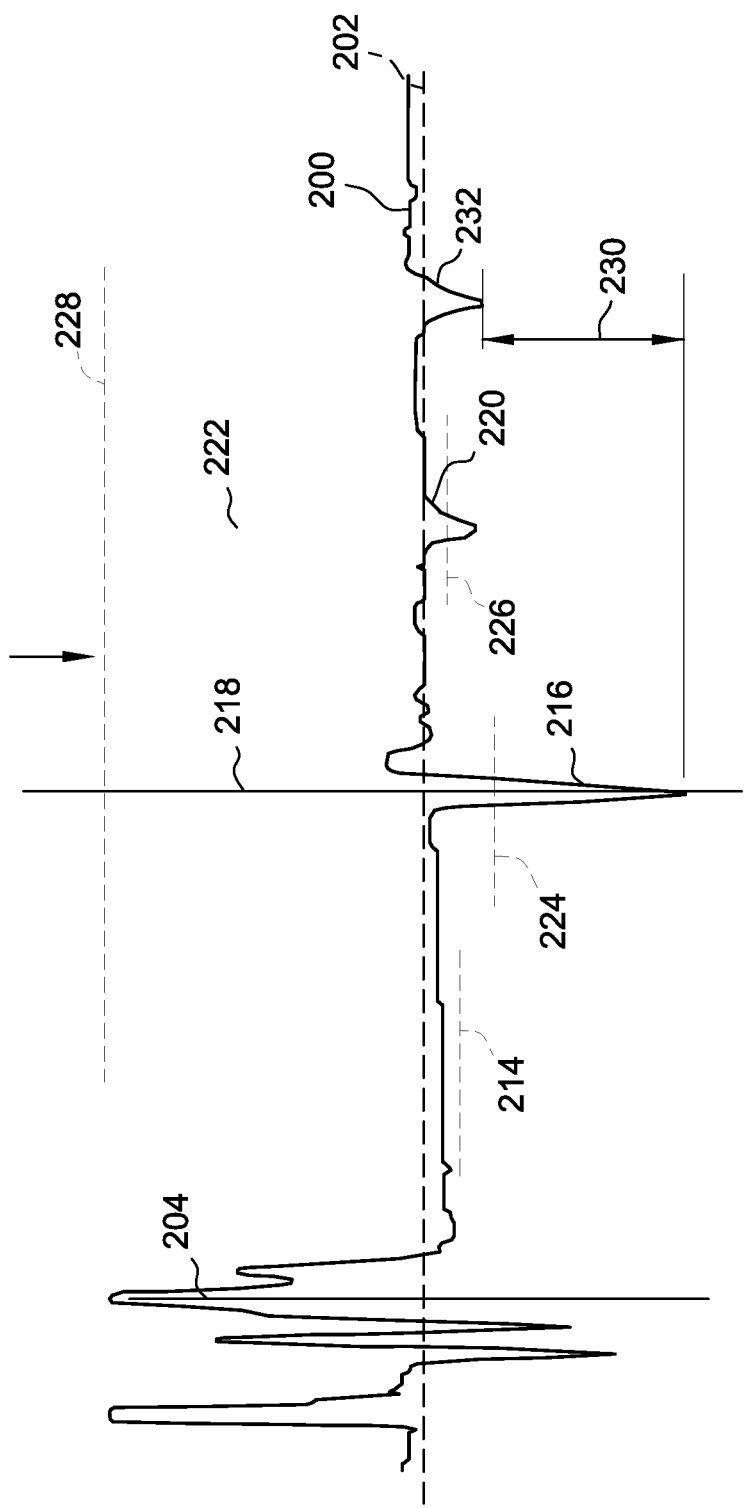
FIG. 2B is another plot showing the example echo curve shown in FIG. 2A.

FIGS. 2A and 2B show an example echo curve 200. A horizontal axis 202 of curve 200 corresponds to a time elapsed, which may be used to compute a corresponding distance when taking into account a velocity of the emitted signal and factors affecting the velocity (e.g., a speed of light in air and/or a reduced speed when traveling through a material having another dielectric constant). A vertical axis 204 corresponds to an amplitude of the echoes. When referring to FIGS. 2A and 2B, a "positive" echo refers to a transition where the impedance increases (e.g., a launch echo) and a "negative" echo refers to a transition where the impedance decreases (e.g., air to surface of liquid). Along horizontal axis 202, FIG. 2A indicates a nozzle length 206, a blocking distance 208, a safety distance 210, and a probe length 212, which all correspond to physical distances within tank 102. Nozzle length 206 is a physical length of a nozzle present in tank 102. Blocking distance 208 is a minimum threshold distance for consideration of an echo as the top level echo, and processor 112 may ignore echoes having a distance less that blocking distance 208 when determining the top level echo. Safety distance 210 is a distance from a top of tank 102 corresponding to a maximum safe fill level of tank 102. Probe length 212 is a physical length of the sensor probe within tank 102.

Any peak exceeding an amplitude threshold 214 as shown in FIG. 2B is identified as an echo by processor 112. A top level echo 216 is indicated in echo curve 200 by a negative peak, and corresponds to a fill level 218. An interface echo 220 corresponding to an interface, such as that between water 108 and oil 110, is indicated by a smaller negative peak, and corresponds to an interface level 222. Depending on the dielectric constant of the upper media and lower media, in some cases, the interface echo may also have a higher amplitude than the top level. Referring to FIG. 2B, an amplitude of top level echo 216 exceeds a level threshold 224, and an amplitude of interface echo 220 exceeds an interface threshold 226. In certain embodiments, processor 112 uses level threshold 224 and/or interface threshold 226 to identify top level echo 216 and interface echo 220, respectively. Alternatively, processor 112 may identify top level echo 216 and interface echo 220 without a use of thresholds. In some embodiments, if any peak amplitude exceeds a broken probe threshold 228, processor 112 determines that sensor 104 is broken or not functioning properly. In certain embodiments, processor 112 is configured to compute a double echo ratio 230 (e.g., a ratio between an amplitude of top level echo 216 and a double echo 232).

FIG. 3 shows another example echo curve 300, which may be, for example, an echo curve generated subsequent to echo curve 200. A top level echo 302 is shifted from top level echo 216 by a cumulative displacement 304, which represents a change in the fill level of tank 102.

Figure 4:
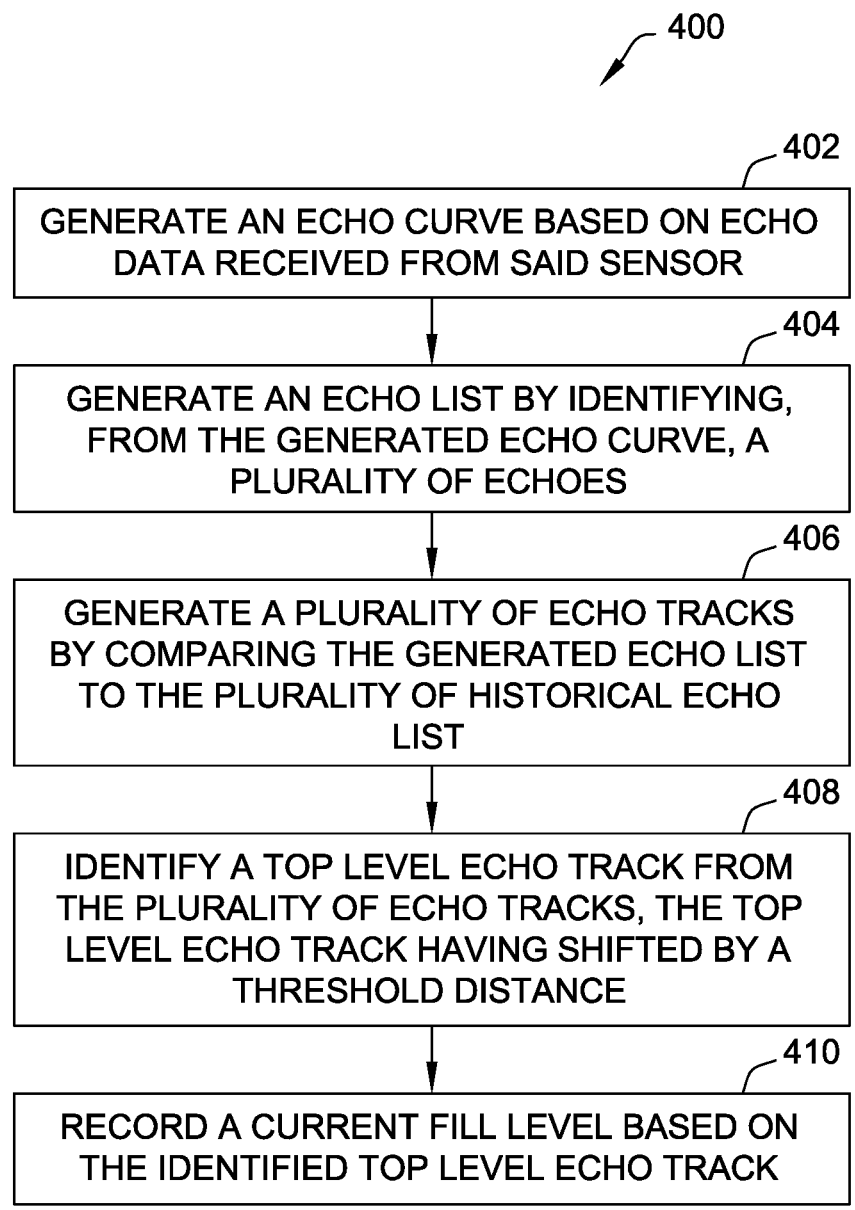
FIG. 4 is a flow diagram of an example method for determining a fill level of a tank.

FIG. 4 is a flow diagram of an example method 400 for measuring a fill level of a liquid (such as water 108 and/or oil 110) in a tank (such as tank 102). In the example embodiment, method 400 is performed by a system including a sensor (such as sensor 104) at least partially disposed in the tank and configured to generate echo data and a computing device (such as computing device 106) including a memory (such as memory 114) configured to store a plurality of historical echo curves and historical echo lists and a processor (such as processor 112) coupled in communication with the sensor.

Method 400 includes generating 402 an echo curve based on echo data received from the sensor.

Method 400 further includes generating 404 an echo list by identifying, from the generated echo curve, a plurality of echoes. In some embodiments, generating 404 the echo list includes detecting echoes based on a Savitzky-Golay filter and an amplitude threshold.

Method 400 further includes generating 406 a plurality of echo tracks by comparing the generated echo list to the plurality of historical echo lists. In certain embodiments, generating 406 the plurality of echo tracks includes generating the plurality of echo tracks further based on at least one recursive filter and at least one association algorithm.

Method 400 further includes identifying 408 a top level echo track from the plurality of echo tracks, the top level echo track having shifted by a threshold distance. In some embodiments, identifying 408 the top level echo track includes identifying the top level track based on a predefined valid echo range.

Method 400 further includes recording 410 a current fill level based on the identified top level echo track.

In some embodiments, method 400 further includes identifying the top level echo track based on a detected echo corresponding to the top level echo track exceeding an amplitude threshold.

In certain embodiments, method 400 further includes identifying at least one of the plurality of echo tracks as corresponding to a stationary object.

In some embodiments, method 400 further includes identifying, by the processor, at least one of the plurality of echo tracks as corresponding to a double echo.

In certain embodiments, method 400 further includes identifying at least one of the plurality of echo tracks as corresponding to an interface between two materials in the tank. In some such embodiments, method 400 further includes determining, by the processor, a distance between the current fill level and the identified interface.

Example embodiments of inverters for a system for measuring a fill level of a liquid in a tank, as well as methods for measuring a fill level of a liquid in a tank, are described in detail. The systems and methods are not limited to the specific embodiments described herein, but rather, components of systems and/or steps of the methods may be utilized independently and separately from other components and/or steps described herein. For example, the method may also be used in combination with other components and are not limited to practice only with the circuits as described herein. Rather, the example embodiment can be implemented and utilized in connection with many other applications.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for measuring a fill level of a tank, the system comprising:
    a sensor at least partially disposed in the tank and configured to generate echo data; and
    a computing device comprising:
        a memory configured to store a plurality of historical echo lists; and
        a processor coupled in communication with the sensor, the processor configured to:
            generate an echo curve based on the echo data received from the sensor;
            generate an echo list by identifying, from the generated echo curve, a plurality of echoes;
            generate a plurality of echo tracks by comparing the generated echo list to the plurality of historical echo lists;
            identify a top level echo track from the plurality of echo tracks based on an echo track that shows a total displacement exceeding a displacement threshold and is located closest to the sensor, wherein the displacement threshold is twice a maximum value between a user-defined minimum displacement threshold and a length between the top level echo track and a detected moving echo track multiplied by a user-defined drift factor; and
            record a current fill level based on the identified top level echo track.

2. The system of claim 1, wherein the processor is further configured to identify the top level echo track based on a detected echo corresponding to the top level echo track exceeding an amplitude threshold.

3. The system of claim 1, wherein the processor is further configured to identify at least one of the plurality of echo tracks as corresponding to a stationary object.

4. The system of claim 1, wherein the processor is further configured to identify at least one of the plurality of echo tracks as corresponding to a double echo.

5. The system of claim 1, wherein the processor is further configured to identify at least one of the plurality of echo tracks as corresponding to an interface between two materials in the tank.

6. The system of claim 5, wherein the processor is further configured to determine a distance between the current fill level and the identified interface.

7. The system of claim 1, wherein to generate the echo list, the processor is configured to detect echoes by applying a Savitzky-Golay filter to the echo curve and identifying peaks of the echo curve that meet an amplitude threshold.

8. The system of claim 7, wherein to identify the top level echo track, the processor is configured to identify the top level echo track based on a predefined valid echo range.

9. A method for measuring a fill level of a tank, the method performed by a system including a sensor at least partially disposed in the tank and configured to generate echo data and a computing device including a memory configured to store a plurality of historical echo lists and a processor coupled in communication with the sensor, the method comprising:
    generating, by the processor, an echo curve based on the echo data received from the sensor;
    generating, by the processor, an echo list by identifying, from the generated echo curve, a plurality of echoes;
    generating, by the processor, a plurality of echo tracks by comparing the generated echo list to the plurality of historical echo lists;
    identifying, by the processor, a top level echo track from the plurality of echo tracks based on an echo track that shows a total displacement exceeding a displacement threshold and is located closest to the sensor, wherein the displacement threshold is twice a maximum value between a user-defined minimum displacement threshold and a length between the top level echo track and a detected moving echo track multiplied by a user-defined drift factor; and
    recording, by the processor, a current fill level based on the identified top level echo track.

10. The method of claim 9, further comprising identifying, by the processor, the top level echo track based on a detected echo corresponding to the top level echo track exceeding an amplitude threshold.

11. The method of claim 9, further comprising identifying, by the processor, at least one of the plurality of echo tracks as corresponding to a stationary object.

12. The method of claim 9, further comprising identifying, by the processor, at least one of the plurality of echo tracks as corresponding to a double echo.

13. The method of claim 9, further comprising identifying at least one of the plurality of echo tracks as corresponding to an interface between two materials in the tank.

14. The method of claim 13, further comprising determining, by the processor, a distance between the current fill level and the identified interface.

15. The method of claim 9, wherein generating the echo list comprises detecting, by the processor, echoes by applying a Savitzky-Golay filter to the echo curve and identifying peaks of the echo curve that meet an amplitude threshold.

16. The method of claim 15, wherein generating the plurality of echo tracks comprises generating, by the processor, the plurality of echo tracks further based on at least one recursive filter and at least one association algorithm.

17. A computing device for measuring a fill level of a tank, the computing device comprising:
    a memory configured to store a plurality of historical echo lists; and
    a processor coupled in communication with a sensor at least partially disposed in the tank, the sensor configured to generate echo data, the processor configured to:
        generate an echo curve based on the echo data received from the sensor;
        generate an echo list by identifying, from the generated echo curve, a plurality of echoes;

generate a plurality of echo tracks by comparing the generated echo list to the plurality of historical echo lists;

identify a top level echo track from the plurality of echo tracks based on an echo track that shows a total displacement exceeding a displacement threshold and is located closest to the sensor, wherein the displacement threshold is twice a maximum value between a user-defined minimum displacement threshold and a length between the top level echo track and a detected moving echo track multiplied by a user-defined drift factor; and record a current fill level based on the identified top level echo track.

18. The computing device of claim 17, wherein the processor is further configured to identify the top level echo track based on a detected echo corresponding to the top level echo track exceeding an amplitude threshold.

19. The computing device of claim 17, wherein the processor is further configured to identify at least one of the plurality of echo tracks as corresponding to a stationary object.

20. The computing device of claim 17, wherein the processor is further configured to identify at least one of the plurality of echo tracks as corresponding to a double echo.

* * * * *